3,143,673
HOMOPOLAR GENERATOR
Coleman du P. Donaldson, Princeton, N.J., assignor to Thompson Ramo Wooldridge Inc., Cleveland, Ohio, a corporation of Ohio
Filed Aug. 8, 1960, Ser. No. 47,997
1 Claim. (Cl. 310—11)

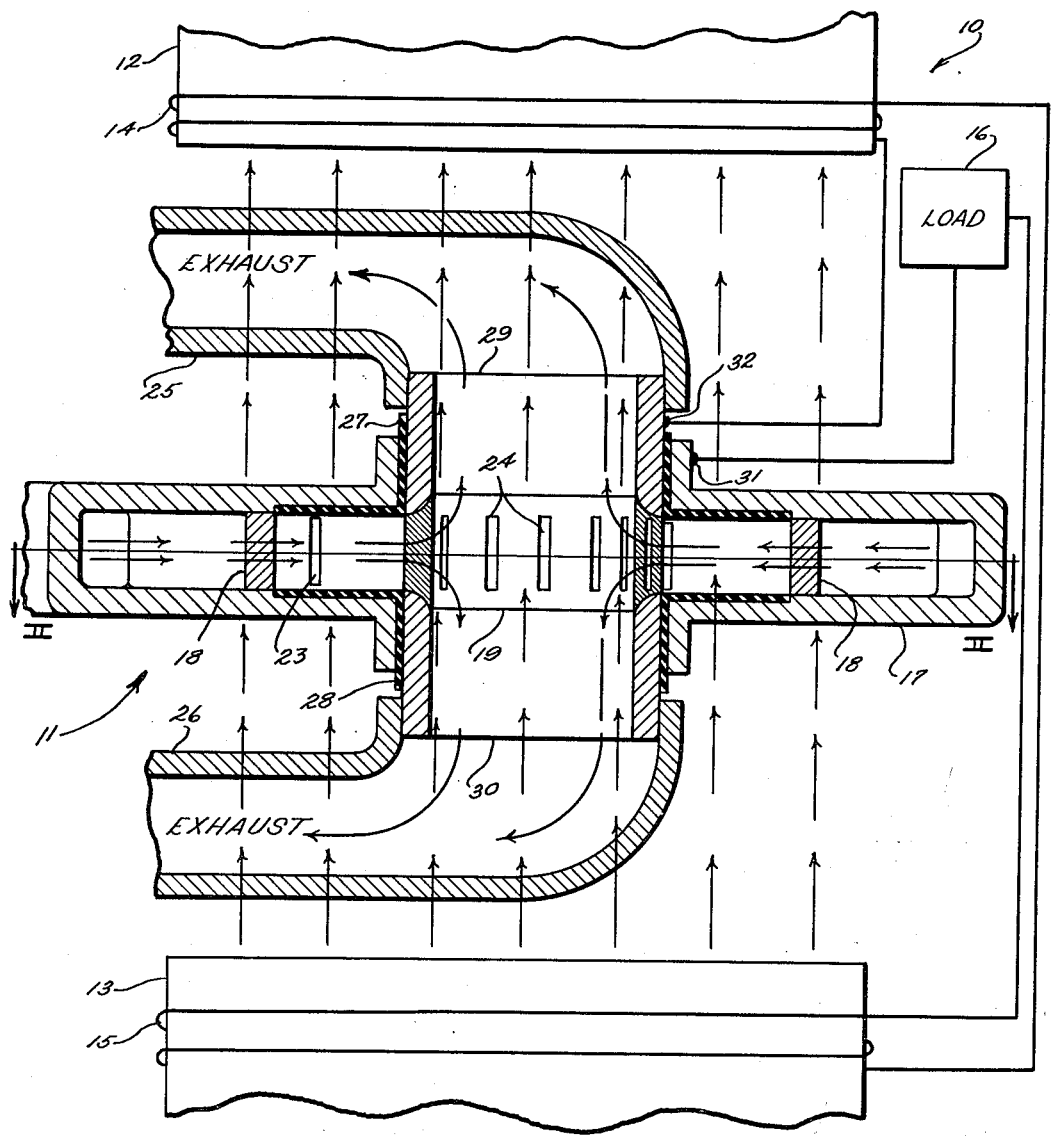

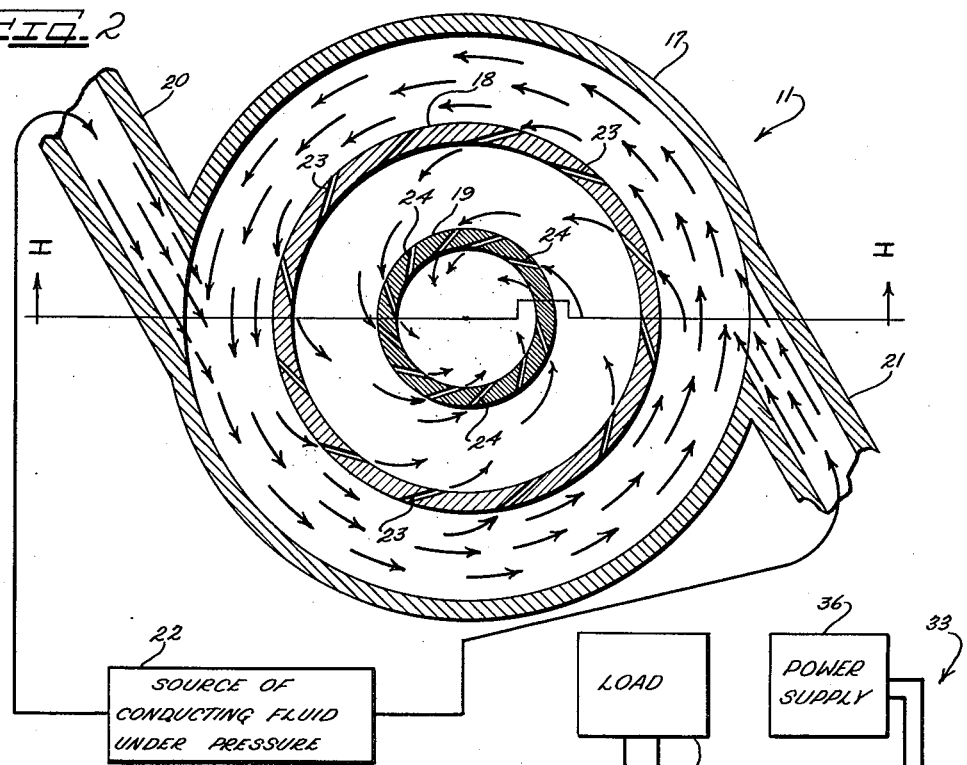
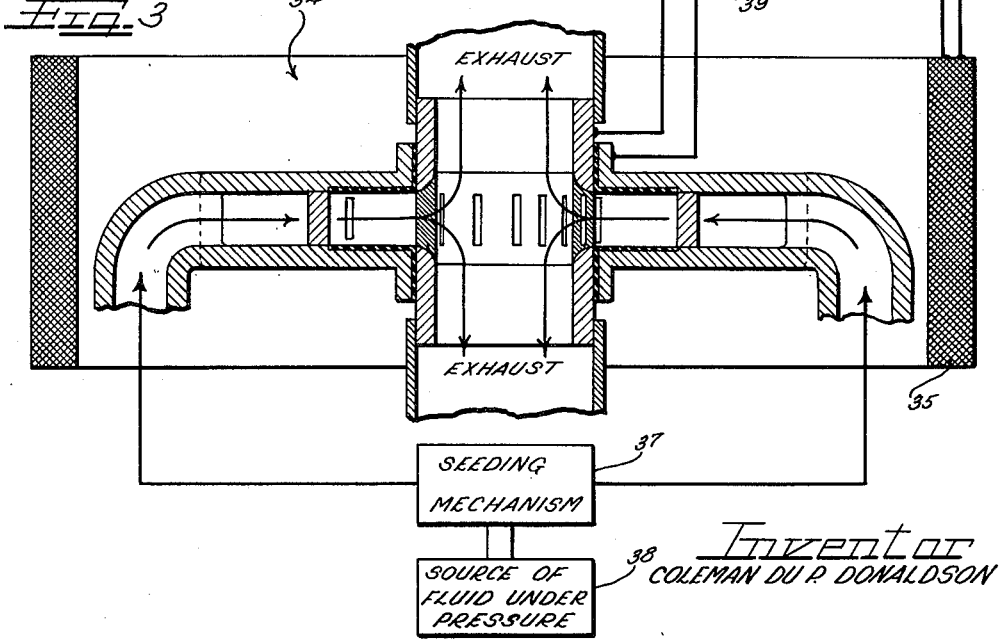

This invention relates to conversion systems and, more particularly, to an apparatus for converting the energy content of a high-speed conducting fluid into electrical power.

Conventional turbine driven electrical generators have serious disadvantages which result from the fact that they contain rotating members. Their power output and efficiency is limited by the strength of the materials used in the rotating members. Since the strength of these materials limits the maximum tip speed of the rotating members, the maximum allowable temperature of the fluid driving the turbine is also limited.

In addition to these disadvantages, conventional power converters are relatively large and heavy, which is a serious disadvantage when they are being considered for use in flight vehicles.

Accordingly, it is a primary object of this invention to provide an electrical power generator that has no rotating parts.

It is another object of this invention to provide an electrical power generator that is essentially vibration free.

It is still another object of this invention to provide an electrical power generator that is very compact and lightweight.

Other objects, features, and advantages of the present invention will be apparent from the following detailed description taken in conjunction with the accompanying figures of the drawings, in which:

FIGURE 1 is a view taken along the line 1—1 of FIGURE 2 of an electrical power generator constructed in accordance with one embodiment of the invention;

FIGURE 2 is a view taken along the line 2—2 of FIGURE 1; and

FIGURE 3 is an illustration of an electrical power generator constructed in accordance with another embodiment of the invention.

The basic principles on which an electrical power generator constructed in accordance with the invention operates are the same as those employed by conventional rotating electrical generators. Whereas in a conventional rotating generator a magnetic field is set up and a conductor is drawn through it in a direction transverse to the field, which induces an electric potential between the ends of the conductor, in a generator constructed in accordance with the invention, a magnetic field is set up and a conducting fluid is directed through it. This action causes an electric potential to be developed between two appropriately placed electrodes that are in contact with the conducting fluid.

As shown on the drawings:

Reference numeral 10 indicates generally an apparatus for developing a magnetic field and reference numeral 11 indicates generally an apparatus for guiding a conducting fluid through this magnetic field and drawing off the electrical power generated.

The magnetic field developing apparatus 10 includes two spaced apart magnetic pole pieces 12 and 13 and two electrical windings 14 and 15 that are wound around the pole pieces 12 and 13, respectively. The windings 14 and 15 are connected in series with each other and with a load 16 in such a manner that a magnetic field is set up in the direction indicated by the dashed lines, FIGURE 1, when electrical current is being generated and delivered to the load 16, as will be described in greater detail hereinafter. Suitable means (not shown) such as a C-shaped magnetic core connected to the two pole pieces 12 and 13 is used to complete the magnetic path.

As is best shown in FIGURE 2, the apparatus 11 for guiding a conducting fluid through the magnetic field set up by the apparatus 10 includes a manifold 17, an outer ring 18 and an inner ring 19. The manifold 17 is connected by two input conduits 20 and 21 to a source 22 of a fluid that is under pressure and electrically conductive, and the outer and inner rings 18 and 19 have a plurality of slots 23 and 24 formed therein. During the operation of the generator fluid from the source 22 is forced through the conduits 20 and 21, into the manifold 17, through the slots 23 in the outer ring 18, through the chamber between the inner and the outer rings, through the slots 24 in the inner ring 19, and into two exhaust conduits 25 and 26.

The planes of the slots 23 make angles with radial lines of the ring 18 so that the fluid injected through the slots 23 has a tangential as well as a radial velocity. This fluid follows a spiral path to the inner ring 19 where it enters the slots 24. The planes of the slots 24 are also set at angles relative to radial lines and these angles are designed so that the tangential momentum of the fluid is altered as little as possible in order to decrease the losses. Another structure that can be used to achieve this purpose is a porous inner ring and means to rotate it at approximately the angular velocity of the fluid at the point of the inner ring. The reason for making the fluid follow a spiral path between the outer and inner rings is that the fluid must pass through the magnetic field a certain distance before it can lose a significant amount of energy to the field. Therefore, this spiral motion provides as long a path as is practical within the volume covered by the magnetic field.

As is shown in FIGURE 1, the outer ring 18 and the manifold 17 are mounted on two collars 29 and 30 that are fastened to the inner ring 19. Two sleeves 27 and 28 that are made of an electrical insulating material electrically separate the two rings 18 and 19. Electrical connections are made to the outer ring 18 and the inner ring 19 by terminals 31 and 32, respectively, which are serially connected to the windings 14 and 15 and the load 16.

When an electrically conductive fluid flows through the apparatus 11 in the manner described in the presence of a magnetic field set up by the apparatus 10, the fluid cuts the lines of magnetic flux as it passes between the outer ring 18 and the inner ring 19 and a potential difference develops between these two rings. When the load 16 is connected to the terminals 31 and 32, this potential difference causes current to flow along the electrical path defined by the windings 14 and 15, the load 16, the rings 18 and 19, and the conducting fluid within the chamber between the rings 18 and 19.

In a manner similar to the build up of a conventional self-excited rotary electric generator, the electric generator illustrated in FIGURES 1 and 2 will build up due to the residual magnetism in the poles 12 and 13. The small voltage developed across the terminals 31 and 32 due to the residual magnetism causes a small current to flow through the windings 14 and 15 and through the load 16. The windings 14 and 15 are wound on the poles 12 and 13 in such a manner that the magnetic field set up this small current adds to the field set up by the residual magnetism, so that the magnetic flux density in the gap between the pole pieces 12 and 13 is increased slightly, which in turn causes a larger voltage to be developed between the terminals 31 and 32 which causes a greater cur- FIGURE 3 is an illustration of an electrical power generator constructed in accordance with another embodiment of the invention. This generator includes an apparatus 33 for setting up a magnetic field and an apparatus 34 for directing the flow of the conducting fluid through this magnetic field.

The apparatus 33 includes a solenoid 35 that is disposed around the apparatus 34, so that the lines of magnetic flux set up when a power supply 36 energizes the solenoid 35 pass through the apparatus 34 in a direction that is substantially transverse to the flow of the fluid between the outer and inner rings.

Since it is desirable to have the conductivity of the working fluid as high as possible, a seeding mechanism 37 is connected to the input conduit between the fluid source 38 and the manifold of the apparatus 34. If the working fluid is a high temperature gas, it can be seeded with easily ionized particles before it enters the chamber between the inner and outer rings.

In this embodiment of the invention, the rings are connected directly to a load 39, and the solenoid 35 is energized by external power supply 36.

It should be understood that other means could be provided for setting up a magnetic field in either of the embodiments illustrated. For example, the windings could be excited by shunt or compound connections to the generator, or one or more permanent magnets could be used.

While the apparatus has been described in open cycle operation wherein the working fluid is continuously exhausted, the apparatus can also be used in closed cycle operation wherein the exhaust conduits are connected to feed the input conduits. In this mode of operation, a mechanism will also have to be connected in the line to add energy to the working fluid before it re-enters the generator. Electrical insulating means will also be required to isolate the exhaust conduit from the input conduit.

Further, the radial flow of the working fluid through the apparatus need not be in an inward direction as described. The generator can also be connected to employ an outward radial flow of the working fluid by connecting the exhaust conduits to the source of the working fluid and exhausting the fluid that enters the manifold. Furthermore, it will not be necessary for some applications to have an inlet manifold as a single tangential inlet nozzle will suffice.

The working fluid may be a conducting liquid but preferably is a high temperature ionized gas. Suitable sources are seeded gas flames, arc jets, and solid propellants. As an example, a cesium-seeded oxygen-acetylene flame may be used. The combustion of oxygen and acetylene at a pressure of one atmosphere and seeded with $Cs_2CO_3$ produces a gas at a temperature of approximately 2500 K. If the percent by weight of cesium added is 8.9, the conductivity of the gas is .535 mho/cm.

In a working model of the generator the probable range of the magnetic flux density will be from 3,000 to 30,000 gauss, the probable range of the conductivity of the fluid will be from 0.1 to 10.0 mho/cm., and the molecular viscosity of the fluid will be on the order of $10^{-3}$ dyne sec./cm.$^2$. The open circuit potential between the rings for large Reynolds numbers in MKSQ units and a stationary effusor ring can be computed from the equation:

$$V = Bv_2R_2 \ln \frac{R_2}{R_1}$$

and the maximum power generated from the equation:

$$W_{max} = \frac{\frac{\pi}{2} l_p \sigma (Bv_2R_2)^2 / \ln(R_2/R_1) /}{1 - \frac{S_u}{2}\left\{1 - \frac{(R_2/R_1)^2 - 1}{2(R_2/R_1)^2 \ln(R_2/R_1)}\right\}}$$

where:

$B$ is the magnetic flux density in the axial direction
$v_2$ is the tangential component of the fluid velocity at the inlet ring
$R_2$ is the radius of the inlet ring (outer ring in flow, inner ring in outflow)
$R_1$ is the radius of the outlet ring
$\sigma$ is the means electrical conductivity of the fluid
$S_u$ is the interaction parameter $= \sigma B^2 R_2 / \rho_2 u_2 = H_a^2/N$
$H_a$ is the Hartmann number
$N$ is the radial Reynolds number
$u_2$ is the radial component of the fluid velocity at the inlet ring
$\rho_2$ is the fluid density at the inlet ring
$l_p$ is the depth of the generator.

It will be apparent that many modifications and variations may be effected without departing from the scope of the novel concepts of the present invention.

I claim as my invention:

An electrical energy generator comprising a hollow cylindrical casing, means for establishing a magnetic field axially of said casing, a pair of concentric, electrically conductive rings of different diameters disposed in said casing, means for introducing an electrically conductive fluid into said casing in a direction whereby said fluid has both tangential and radial components with respect to said rings, the outer of said pair of rings having a plurality of non-radial slots arranged to direct said fluid with tangential and radial components toward said inner ring, said inner ring also having non-radial slots extending therethrough for directing said fluid centrally thereof, and means for exhausting said fluid centrally of said inner ring.

References Cited in the file of this patent

UNITED STATES PATENTS

| | | |
|---|---|---|
| 1,196,511 | Borger | Aug. 29, 1916 |
| 1,443,091 | Petersen | Jan. 23, 1923 |